(12) United States Patent
Itaya et al.

(10) Patent No.: US 11,184,541 B2
(45) Date of Patent: Nov. 23, 2021

(54) IMAGING DEVICE

(71) Applicant: Panasonic Intellectual Property Management Co., Ltd., Osaka (JP)

(72) Inventors: Shunsuke Itaya, Osaka (JP); Rikiya Ejima, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 333 days.

(21) Appl. No.: 16/479,592

(22) PCT Filed: Feb. 13, 2019

(86) PCT No.: PCT/JP2019/005103
§ 371 (c)(1),
(2) Date: Jul. 20, 2019

(87) PCT Pub. No.: WO2020/121541
PCT Pub. Date: Jun. 18, 2020

(65) Prior Publication Data
US 2021/0337125 A1    Oct. 28, 2021

(30) Foreign Application Priority Data
Dec. 10, 2018  (JP) .............................. JP2018-230935

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01); *H04N 5/23258* (2013.01)

(58) Field of Classification Search
CPC ............. H04N 5/23287; H04N 5/2253; H04N 5/23258; H04N 5/23267; H04N 5/2328;
(Continued)

(56) References Cited

U.S. PATENT DOCUMENTS 7,471,886 B2 * 12/2008 Hirota ...................... G03B 5/00
                                                              382/255
7,499,635 B2 *  3/2009 Tanaka ................... G03B 17/00
                                                              33/1 M
(Continued)

FOREIGN PATENT DOCUMENTS

JP     H09-033562 A    2/1997
JP     2008-151822 A   7/2008
(Continued)

OTHER PUBLICATIONS

International Preliminary Report on Patentability for corresponding International Application No. PCT/JP2019/005103, dated Jun. 24, 2021.
(Continued)

*Primary Examiner* — Pritham D Prabhakher
(74) *Attorney, Agent, or Firm* — Renner, Otto, Boisselle & Sklar, LLP

(57) ABSTRACT

An imaging device is provided that can correct more accurately an image shake. The imaging device includes an imaging element taking an object image to generate image data, a gyro sensor unit including a gyro sensor, an image-shake correction unit holding the imaging element, moving the imaging element based on an output of the gyro sensor, and correcting a shake of an object image taken by the imaging element, and a mount base holding the gyro sensor unit and the image-shake correction unit.

6 Claims, 13 Drawing Sheets

(58) Field of Classification Search
CPC ........... H04N 5/23296; H04N 5/23248; G02B 27/646; G08B 13/19617; G03B 9/16; G03B 9/42; G03B 17/14; G03B 5/08; G03B 5/00; G03B 2217/005; G03B 2205/0007
USPC ...................................................... 348/208.2
See application file for complete search history.

(56) References Cited

U.S. PATENT DOCUMENTS

| | | | | |
|---|---|---|---|---|
| 7,576,778 | B2* | 8/2009 | Hirota | G03B 5/00 348/208.5 |
| 7,830,416 | B2* | 11/2010 | Tanaka | H04N 5/23287 348/208.99 |
| 8,059,949 | B2* | 11/2011 | Mogamiya | G01C 21/18 396/53 |
| 10,171,737 | B2* | 1/2019 | Kikuchi | H04N 5/2251 |
| 2006/0055787 | A1* | 3/2006 | Hirota | H04N 5/2253 348/208.5 |
| 2006/0056830 | A1* | 3/2006 | Tanaka | G03B 17/00 396/55 |
| 2006/0056839 | A1* | 3/2006 | Abe | G03B 17/02 396/452 |
| 2006/0057829 | A1* | 3/2006 | Wu | H01L 21/3212 438/597 |
| 2006/0133786 | A1* | 6/2006 | Teramoto | H04N 5/232933 396/55 |
| 2008/0145041 | A1 | 6/2008 | Enomoto | |
| 2008/0181592 | A1* | 7/2008 | Ya | G01C 21/18 396/53 |
| 2009/0231450 | A1* | 9/2009 | Tanaka | H04N 5/238 348/208.7 |
| 2017/0329203 | A1 | 11/2017 | Kawai | |
| 2018/0103205 | A1* | 4/2018 | Kikuchi | H04N 5/2251 |
| 2018/0288329 | A1 | 10/2018 | Wada | |
| 2018/0316863 | A1 | 11/2018 | Iseno | |

FOREIGN PATENT DOCUMENTS

| | | |
|---|---|---|
| JP | 2013-160898 A | 8/2013 |
| JP | 2017-207541 A | 11/2017 |
| JP | 2018060160 A | 4/2018 |
| JP | 2018-174482 A | 11/2018 |
| JP | 2018185496 A | 11/2018 |

OTHER PUBLICATIONS

International Search Report for corresponding Application No. PCT/JP2019/005103, dated May 14, 2019.
Written Opinion for corresponding Application No. PCT/JP2019/005103, dated May 14, 2019.
Japanese Decision of Rejection for corresponding Japanese Application No. 2019-534765 dated Sep. 29, 2020.
Japanese Decision of Dismissal for corresponding Japanese Application No. 2019-534765 dated Sep. 29, 2020.
Office Action for corresponding Japanese Application No. 2019-534765 dated Apr. 21, 2020.

* cited by examiner

IMAGING DEVICE

TECHNICAL FIELD

The present disclosure relates to an imaging device having an image-shake correction function.

BACKGROUND ART

A conventionally known imaging device of this type is disclosed in Patent Document 1 (JP 2008-151822 A), for example. Patent Document 1 discloses an imaging device performing an image-shake correction based on an output from a gyro sensor detecting a shake of the device.

PRIOR ART DOCUMENT

Patent Document

Patent Document 1: JP 2008-151822 A

SUMMARY OF THE INVENTION

Problem to be Solved by the Invention

However, the conventional imaging device still has room for improvement from the viewpoint of more accurately correcting an image shake.

An object of the present disclosure is to solve the problem and to provide an imaging device capable of more accurately correcting an image shake.

Means for Solving Problem

An imaging device according to the present disclosure comprises:
- an imaging element taking an object image to generate image data;
- a gyro sensor unit including a gyro sensor;
- an image-shake correction unit holding the imaging element, moving the imaging element based on an output of the gyro sensor, and correcting a shake of an object image taken by the imaging element; and
- a mount base holding the gyro sensor unit and the image-shake correction unit.

Effect of the Invention

The imaging device according to the present disclosure can more accurately correct an image shake.

MODES FOR CARRYING OUT THE INVENTION

Findings Underlying the Present Disclosure

Figure 1:
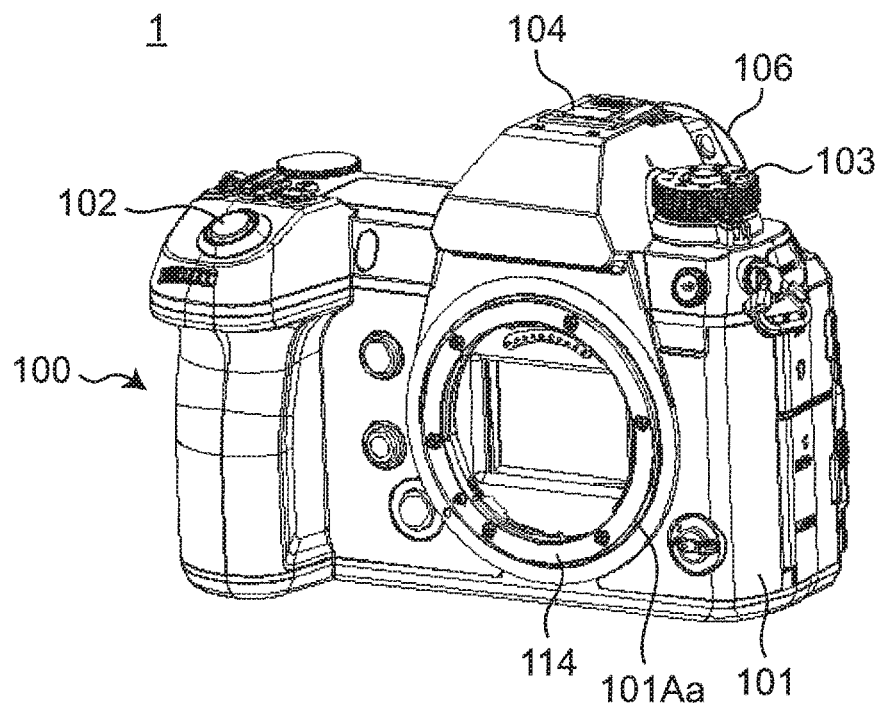
FIG. 1 is a perspective view of a camera body included in an imaging device according to an embodiment as viewed from the front side.

As a result of intensive studies for more accurately correcting an image shake, the inventors obtained the following knowledge.

To accurately correct an image shake caused by a camera shake etc., it is effective to increase a sensitivity of a gyro sensor. However, when the sensitivity of the gyro sensor is increased, the gyro sensor may erroneously detect a disturbance such as an impact of a shutter as a camera shake.

A conventional imaging device is configured such that the gyro sensor is attached to a member separated from a member to which the shutter is attached, for example, an exterior member or a main board. However, this configuration leads to a larger number of members interposed between the gyro sensor and an imaging element or a longer distance therebetween. Consequently, when a shake of the device occurs, a difference in movement amount becomes larger between the gyro sensor and the imaging element, and the accuracy of image-shake correction is reduced.

In this regard, the inventors found a configuration in which an image-shake correction unit holding an imaging element and a gyro sensor unit having a gyro sensor are held by the same mount base. This configuration can reduce the number of members interposed between the gyro sensor and the imaging element and shorten the distance therebetween to make the difference in movement amount smaller between the gyro sensor and the imaging element when a shake of the device occurs. Additionally, in an assembly stage of the device, positions, materials, weights, etc. of components can be adjusted so as to suppress erroneous detection of the gyro sensor and reduce the difference in movement amount between the gyro sensor and the imaging element while the units are held by the mount base. By fixing the mount base holding the units to the exterior member after the adjustment, the image shake can more accurately be corrected. Based on these novel findings, the inventors complete the following invention.

A first aspect of the present disclosure provides an imaging device comprising:
an imaging element taking an object image to generate image data;
a gyro sensor unit including a gyro sensor;
an image-shake correction unit holding the imaging element, moving the imaging element based on an output of the gyro sensor, and correcting a shake of an object image taken by the imaging element; and
a mount base holding the gyro sensor unit and the image-shake correction unit.

A second aspect of the present disclosure provides the imaging device according to the first aspect, further comprising a shutter unit including a shutter for blocking an object image focused on the imaging element, wherein
the mount base further holds the shutter unit.

A third aspect of the present disclosure provides the imaging device according to the first or second aspect, wherein the mount base is fixed to an exterior member.

A fourth aspect of the present disclosure provides the imaging device according to any one of the first to third aspects, wherein the gyro sensor unit includes a sensor-side cushion material disposed between the gyro sensor and the mount base to allow the gyro sensor to move relative to the mount base.

A fifth aspect of the present disclosure provides the imaging device according to the fourth aspect, wherein the gyro sensor unit includes
a gyro holder including a first principal surface and a second principal surface opposite to the first principal surface and holding the gyro sensor on the first principal surface, and
a gyro base fixed to the mount base, and wherein
the sensor-side cushion material is disposed between the gyro base and the second principal surface of the gyro holder to allow the gyro base and the gyro holder to move relative to each other.

A sixth aspect of the present disclosure provides the imaging device according to the fifth aspect, wherein the gyro holder is made of metal.

A seventh aspect of the present disclosure provides the imaging device according to the fifth or sixth aspect, wherein the gyro base is fixed to the mount base inside an outer shape of the gyro holder when viewed in a direction of attachment to the mount base.

An eighth aspect of the present disclosure provides the imaging device according to the seventh aspect, wherein
the gyro holder has a concave part on the second principal surface side, and wherein
the gyro base is housed in the concave part.

A ninth aspect of the present disclosure provides the imaging device according to the eighth aspect, wherein
the gyro base has a convex part projecting in a direction away from a bottom surface of the concave part and fixed to the mount base, and wherein
the gyro sensor unit further includes
a ring-shaped gyro plate fixed to the gyro holder to hold the gyro base in the concave part, and
a ring-shaped plate-side cushion material disposed between the gyro base and the gyro plate and around the convex part.

A tenth aspect of the present disclosure provides a gyro sensor unit comprising:
a gyro sensor;
a gyro holder including a first principal surface and a second principal surface opposite to the first principal surface and holding the gyro sensor on the first principal surface;
a gyro base; and
a sensor-side cushion material disposed between the gyro base and the second principal surface of the gyro holder to allow the gyro base and the gyro holder to move relative to each other.

An eleventh aspect of the present disclosure provides the gyro sensor unit according to the tenth aspect, wherein
the gyro holder has a concave part on the second principal surface side, and wherein
the gyro base is housed in the concave part.

A twelfth aspect of the present disclosure provides the gyro sensor unit according to the eleventh aspect, wherein
the gyro base has a convex part projecting in a direction away from a bottom surface of the concave part, wherein
the gyro sensor unit further comprises
a ring-shaped gyro plate fixed to the gyro holder to retain the gyro base in the concave part, and
a ring-shaped plate-side cushion material disposed between the gyro base and the gyro plate and around the convex part.

An embodiment will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The accompanying drawings and the following description are provided for sufficient understanding of the present disclosure by those skilled in the art, and it is not intended to limit the subject matter described in claims thereto.

In the following description, for convenience of description, terms indicative of directions such as "upper", "lower", "front surface", and "back surface" are used on the assumption of a normal usage state; however, this does not mean the limitation of the usage state etc. of the imaging device of the present invention.

Embodiment

Figure 2:
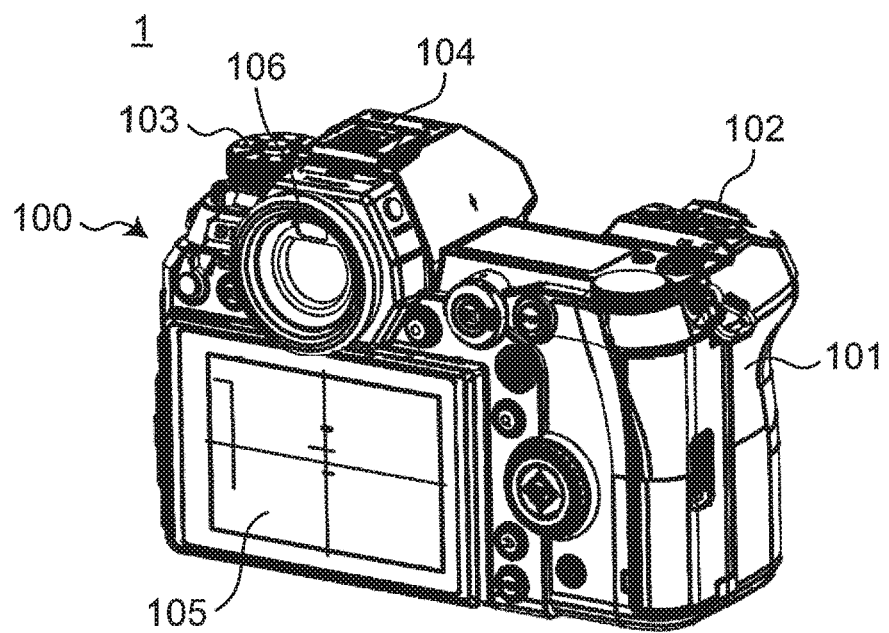
FIG. 2 is a perspective view of the camera body of FIG. 1 as viewed from the back side.
Figure 3:
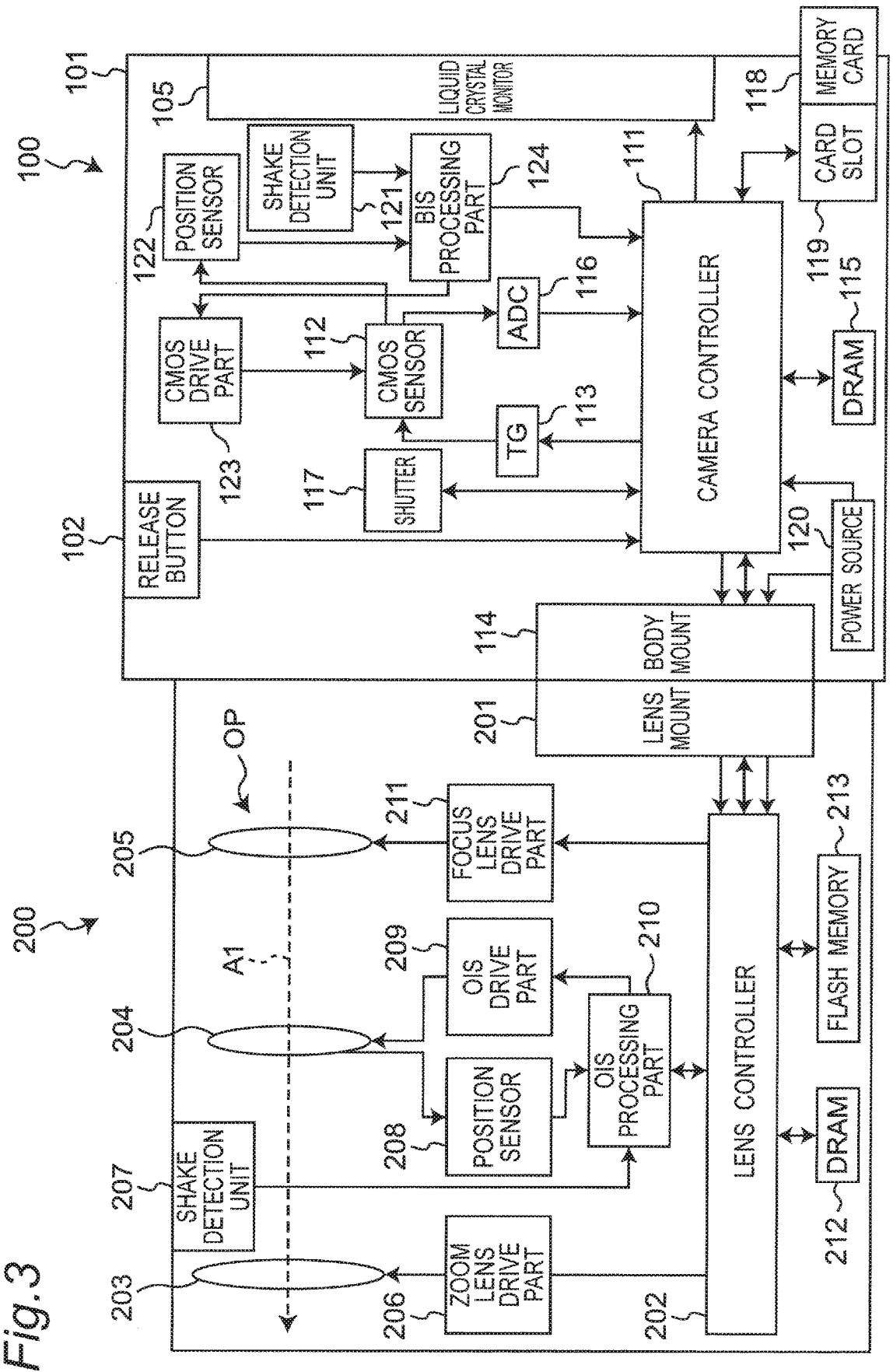
FIG. 3 is a block diagram showing a schematic configuration of the imaging device according to the embodiment.

FIG. 1 is a perspective view of an imaging device according to an embodiment as viewed from the front side. FIG. 2 is a perspective view of the imaging device of FIG. 1 as viewed from the back side. FIG. 3 is a block diagram showing a schematic configuration of the imaging device of FIG. 1.

In the embodiment, the imaging device 1 is a lens-interchangeable digital camera. The imaging device 1 includes a camera body 100 and an interchangeable lens unit 200 detachably attached to the camera body 100. FIGS. 1 and 2 show a state in which the interchangeable lens unit 200 is removed from the camera body 100.

As shown in FIG. 1, the camera body 100 includes an exterior member 101. The exterior member 101 is provided with various buttons such as a release button 102 for giving an instruction for photographing, and various operation members such as a mode dial 103 for performing various settings related to photographing. A user can perform detailed settings of photographing, reproduction, etc. by using the various buttons and the various operation members. An upper portion of the exterior member 101 is provided with a hot shoe 104 to which an external strobe device etc. having a large light emission amount can be attached.

As shown in FIG. 2, a back surface of the exterior member 101 is provided with a liquid crystal monitor 105 that is an example of a display panel displaying a still image or a moving image taken by the camera body 100, various pieces of setting information, etc. A finder 106 is disposed on an upper portion of the back surface of the exterior member 101.

As shown in FIG. 3, the camera body 100 includes a camera controller 111 and a CMOS (Complementary Metal Oxide Semiconductor) sensor 112 that is an example of an imaging element.

The camera controller 111 controls constituent elements such as a CMOS sensor 112 in accordance with instructions from the various buttons such as the release button 102 and the various operation members and thereby controls an overall operation of the imaging device 1. Specifically, the camera controller 111 transmits a vertical synchronization signal to a timing generator (TG) 113 and generates an exposure synchronization signal based on the vertical synchronization signal. The camera controller 111 periodically transmits the generated exposure synchronization signal to the interchangeable lens unit 200 via a body mount 114. As a result, the camera controller 111 controls the interchangeable lens unit 200 in synchronization with the timing of exposure. The camera controller 111 includes a CPU etc., and the CPU executes a program (software) to implement a predetermined function. The camera controller 111 may include a processor made up of a dedicated electronic circuit designed to implement a predetermined function, instead of the CPU. Therefore, the camera controller 111 can be implemented by various processors such as a CPU, an MPU, a GPU, a DSU, an FPGA, and an ASIC. The camera controller 111 may be made up of one or more processors. The camera controller 111 uses a DRAM 115 as a work memory at the time of control operation and image processing operation.

The CMOS sensor 112 takes an object image entering through the interchangeable lens unit 200 to generate image data. The image data generated by the CMOS sensor 112 is digitized by an analog-digital conversion circuit (ADC) 116. The image data digitized by the analog-digital conversion circuit is subjected to a predetermined image process by the camera controller 111. The image data subjected to the image process by the camera controller 111 is displayed on the liquid crystal monitor 105.

The CMOS sensor 112 operates at timing controlled by the timing generator 113. Examples of the operation of the CMOS sensor 112 include a still image taking operation, a through image taking operation, a data transfer operation, an electronic shutter operation, etc.

A shutter 117 capable of blocking an object image focused on the CMOS sensor 112 is disposed on the front side of the CMOS sensor 112 (on the side closer to the interchangeable lens unit 200). In the embodiment, the shutter 117 is a focal plane shutter. The shutter 117 is configured to be switchable between states of blocking and transmitting light from an optical system included in the interchangeable lens unit 200 toward the CMOS sensor 112. The shutter 117 controls a shielding or transmission time to control an exposure time of the CMOS sensor 112. In the embodiment, the shutter 117 includes a front curtain and a rear curtain (not shown). When a still image or a moving image is taken, the front curtain and the rear curtain sequentially move and stop at a predetermined place. The exposure time is from the start of the movement of the front curtain to the stop of the rear curtain. When the front curtain and the rear curtain stop, the front curtain and the rear curtain each come into contact with a buffer material inside the exterior member 101. This causes an impact so that components around the shutter 117 vibrate. The period from the stop of the front curtain causing the impact until the stop of the rear curtain is during exposure, and therefore, the photographing is being continued. In other words, photographing is performed while the components around the shutter 117 are vibrating due to the impact of the shutter 117. This results in an image shake.

The camera body 100 also includes a card slot 119 to which a memory card 118 is detachably connected, and a power source 120.

The card slot 119 is configured such that the memory card 118 can electrically and mechanically be connected. The memory card 118 is an external memory internally including a storage element such as a flash memory. The memory card 118 stores various data including the image data subjected to the image process by the camera controller 111. For example, various data stored in the memory card 118 are read by the camera controller 111 via the card slot 119 and displayed on the liquid crystal monitor 105.

The power source 120 supplies electric power for driving the imaging device 1. The power source 120 may be, for example, a dry cell battery or a rechargeable battery, or may supply electric power externally supplied through a power cord to the imaging device 1. When the power source 120 is turned on, the camera controller 111 supplies electric power to parts of the camera body 100. The camera controller 111 also supplies electric power via the body mount 114 to the interchangeable lens unit 200. The electric power is supplied by a lens controller 202 described later to parts of the interchangeable lens unit 200.

The body mount 114 is configured to be mechanically and electrically connectable to a lens mount 201 included in the interchangeable lens unit 200. The body mount 114 is configured such that data can be transmitted and received between the camera body 100 and the interchangeable lens unit 200 via the lens mount 201. The body mount 114 transmits the exposure synchronization signal and other control signals received from the camera controller 111 to the lens controller 202 via the lens mount 201. The body mount 114 transmits a signal received from the lens controller 202 via the lens mount 201 to the camera controller 111.

The camera body 100 also includes, as a configuration implementing a BIS (Body Image Stabilizer) function, a shake detection unit 121, a position sensor 122, a CMOS drive part 123, and a BIS processing part 124. The "BIS function" refers to a function of correcting a camera shake by moving the CMOS sensor 112.

The shake detection unit 121 is a unit detecting a shake of the exterior member 101. The position sensor 122 is a sensor detecting the position of the CMOS sensor 112 in a plane perpendicular to an optical axis direction A1 of an optical system OP included in the interchangeable lens unit 200. The position sensor 122 can be implemented by a magnet and a Hall element, for example. The CMOS drive part 123 moves the CMOS sensor 112. The CMOS drive part 123 can be implemented by a magnet and a flat coil, for example. The CMOS drive part 123 may also include an actuator, such as a stepping motor and an ultrasonic motor. The BIS processing part 124 controls the CMOS drive part 123 based on detection results of the shake detection unit 121 and the position sensor 122 to perform a shake correction process of moving the CMOS sensor 112 in a plane perpendicular to the optical axis direction A1 to cancel the shake of the exterior member 101.

The interchangeable lens unit 200 includes the lens mount 201. The lens mount 201 is configured to be mechanically and electrically connectable to the body mount 114. The lens mount 201 is supplied with electric power via the body mount 114 and supplies the electric power to parts of the interchangeable lens unit 200.

The interchangeable lens unit 200 also includes the optical system OP and the lens controller 202.

The optical system OP is a combination of optical members for forming an object image on an imaging surface of the CMOS sensor 112. The optical system OP includes a zoom lens 203, an OIS (Optical Image Stabilizer lens 204, and a focus lens 205.

The zoom lens 203 is a lens for changing a magnification of an object image formed by the optical system OP. The zoom lens 203 is made up of one or more lenses. The zoom lens 203 is moved back and forth in the optical axis direction A1 by a zoom lens drive part 206. The zoom lens drive part 206 includes a zoom ring etc. that can be operated by the user and transmits an operation by the user to the zoom lens 203 to move the zoom lens 203 back and forth in the optical axis direction A1.

The OIS lens 204 is a lens for correcting a shake of the object image formed by the optical system of the interchangeable lens unit 200. The OIS lens 204 is made up of one or more lenses. The OIS lens 204 moves in a direction canceling the shake of the imaging device 1 to reduce the shake of the object image on the CMOS sensor 112. A function of correcting a camera shake by moving the OIS lens 204 is referred to as an "OIS function". The interchangeable lens unit 200 includes a shake detection unit 207, a position sensor 208, an OIS drive part 209, and an OIS processing part 210, as a configuration implementing the OIS function.

The shake detection unit 207 is a unit detecting a shake of the interchangeable lens unit 200. The position sensor 208 is a sensor detecting the position of the OIS lens 204 in a plane perpendicular to the optical axis direction A1. The position sensor 208 can be implemented by a magnet and a Hall element, for example. The OIS drive part 209 moves the OIS lens 204. The OIS drive part 209 can be implemented by a magnet and a flat coil, for example. The OIS processing part 210 controls the OIS drive part 209 based on detection results of the shake detection unit 207 and the position sensor 208 to perform a shake correction process of moving the OIS lens 204 in a plane perpendicular to the optical axis direction A1 to cancel the shake of the interchangeable lens unit 200.

The focus lens 205 is a lens for changing a focus state of the object image formed on the CMOS sensor 112 by the optical system OP. The focus lens 205 is made up of one or more lenses. The focus lens 205 is moved by a focus lens drive part 211 in the optical axis direction A1.

The focus lens drive part 211 includes a focus ring etc. that can be operated by the user and transmits an operation by the user to the focus lens 205 to move the focus lens 205 back and forth in the optical axis direction A1.

The zoom lens drive part 206, the OIS processing part 210, and the focus lens drive part 211 are controlled by the lens controller 202.

The lens controller 202 controls the overall operation of the interchangeable lens unit 200 in accordance with control from the camera controller 111. The lens controller 202 includes a CPU etc., and the CPU executes a program (software) to implement a predetermined function. The lens controller 202 may include a processor made up of a dedicated electronic circuit designed to implement a predetermined function, instead of the CPU. Therefore, the lens controller 202 can be implemented by various processors such as a CPU, an MPU, a GPU, a DSU, an FPGA, and an ASIC.

The lens controller 202 controls the zoom lens drive part 206, the OIS processing part 210, and the focus lens drive part 211 based on information stored in a DRAM 212 and a flash memory 213. The lens controller 202 uses the DRAM 212 as a work memory when controlling the zoom lens drive part 206, the OIS processing part 210, and the focus lens drive part 211.

The flash memory 213 stores programs, parameters, lens data, etc. used in the control of the lens controller 202. In this case, the lens data includes a lens name, a lens ID, a serial number, an F number, a focal distance, the presence/absence of a motorized zoom function, resolution characteristic information, characteristic values unique to the interchangeable lens unit 200, etc. The lens data stored in the flash memory 213 is transmitted to the camera controller 111 by the lens controller 202. The camera controller 111 performs various control operations based on the lens data.

Figure 4:
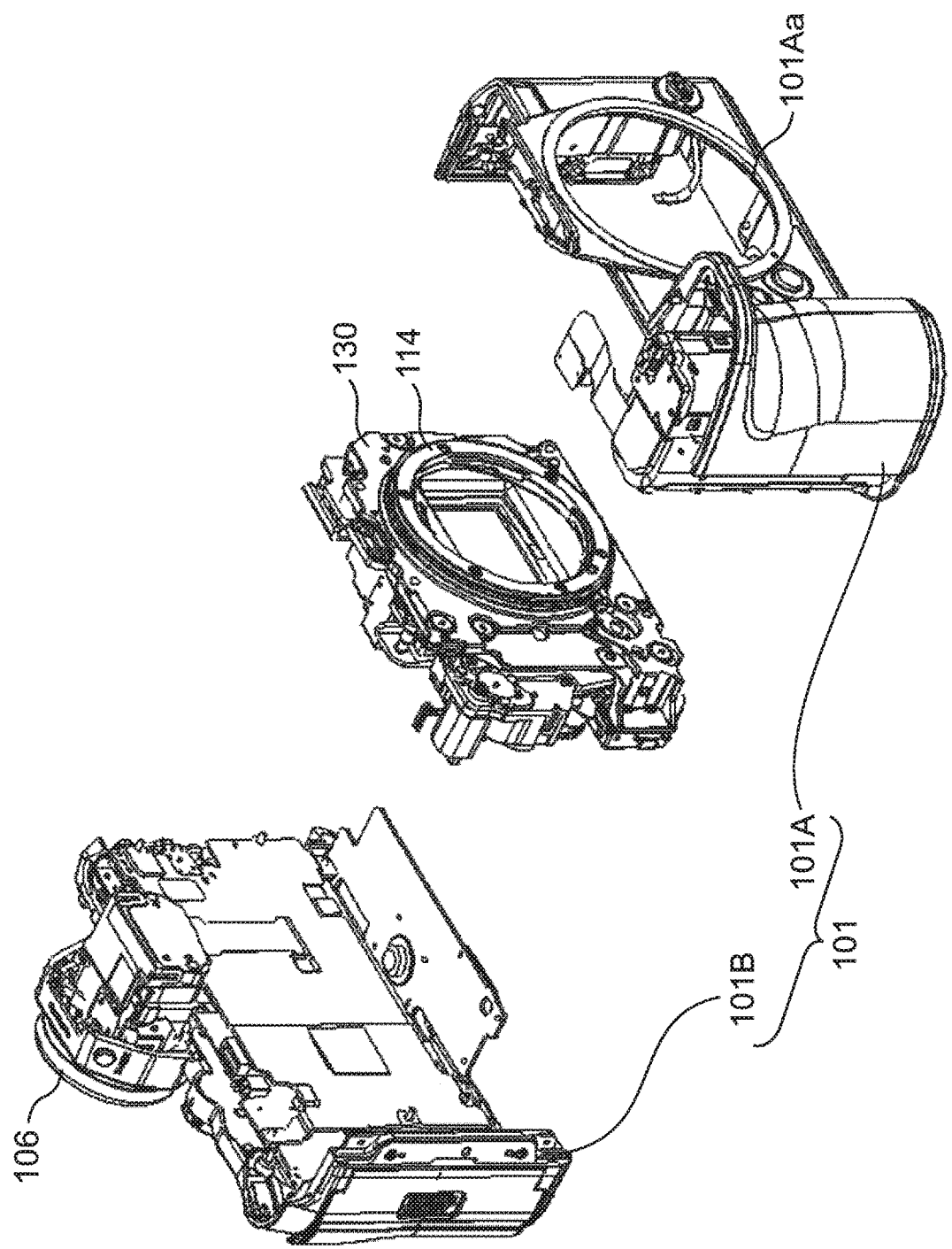
FIG. 4 is an exploded perspective view of the camera body of FIG. 1 as viewed from the front side.
Figure 5:
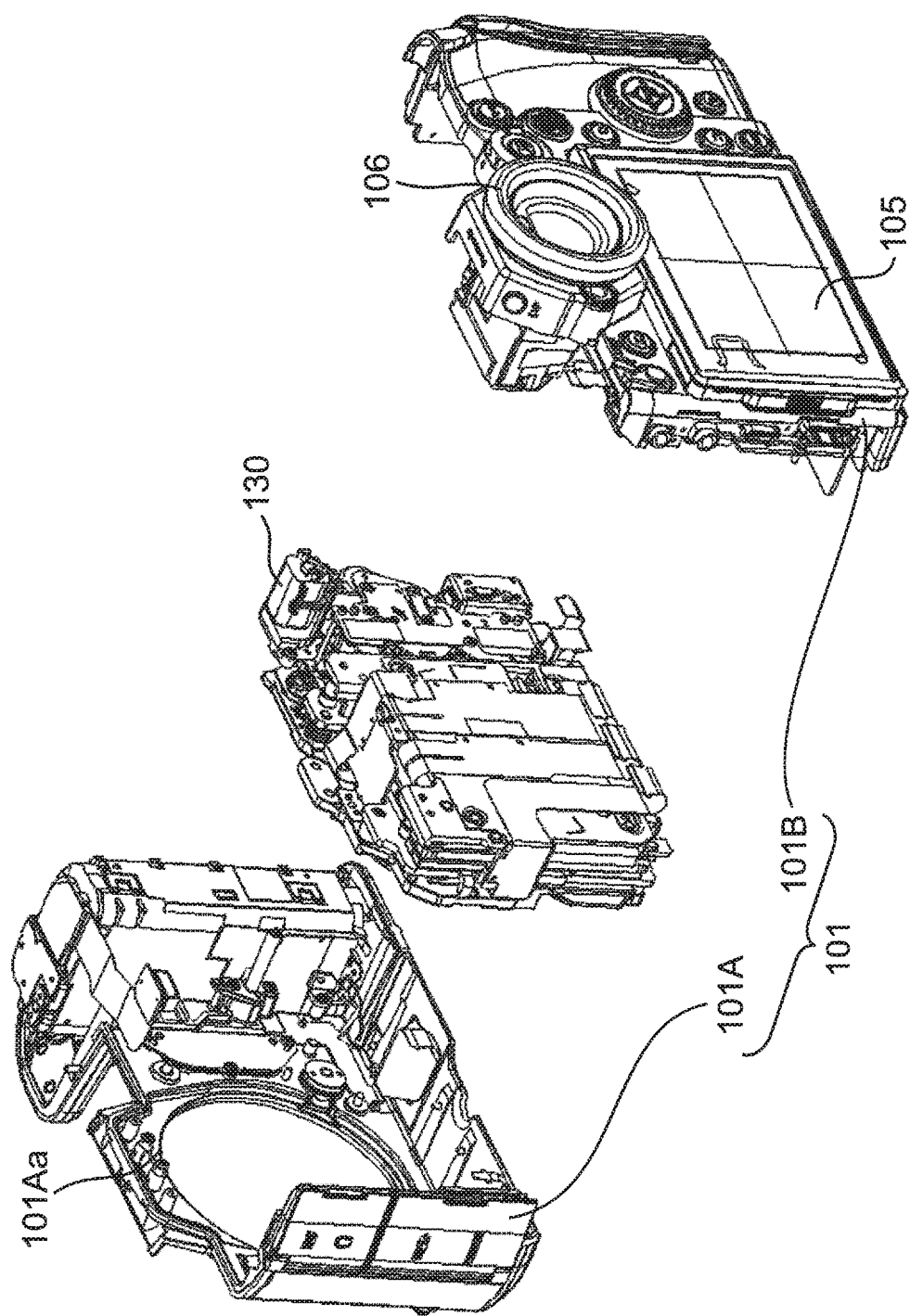
FIG. 5 is an exploded perspective view of the camera body of FIG. 1 as viewed from the back side.

The internal configuration of the camera body 100 will be described in more detail. FIG. 4 is an exploded perspective view of the camera body 100 as viewed from the front side. FIG. 5 is an exploded perspective view of the camera body 100 as viewed from the back side. In FIGS. 4 and 5, an upper portion of the camera body 100 is not shown.

As shown in FIGS. 4 and 5, the exterior member 101 includes a front unit 101A and a back unit 101B. A mount box 130 is disposed between the front unit 101A and the rear unit 101B. A main board (not shown) equipped with the camera controller 111 etc. is incorporated inside the back unit 101B.

The mount box 130 includes the body mount 114. In the embodiment, the body mount 114 is formed into a ring shape. The body mount 114 is disposed such that when the front unit 101A and the rear unit 101B are combined, the body mount 114 is exposed from an opening 101Aa disposed in the front unit 101A.

Figure 6:
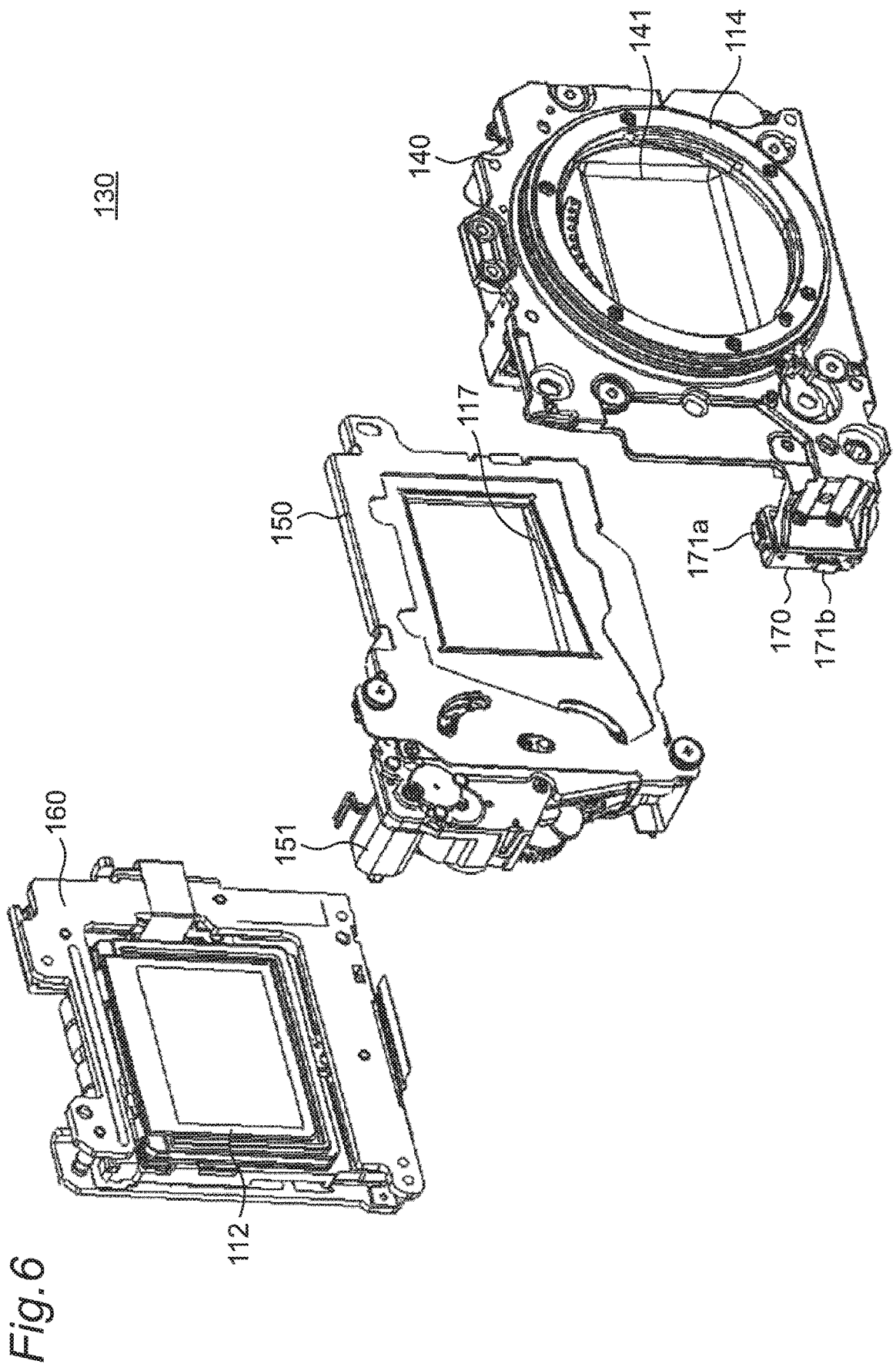
FIG. 6 is an exploded perspective view of a mount box included in the camera body of FIG. 1 as viewed from the front side.
Figure 7:
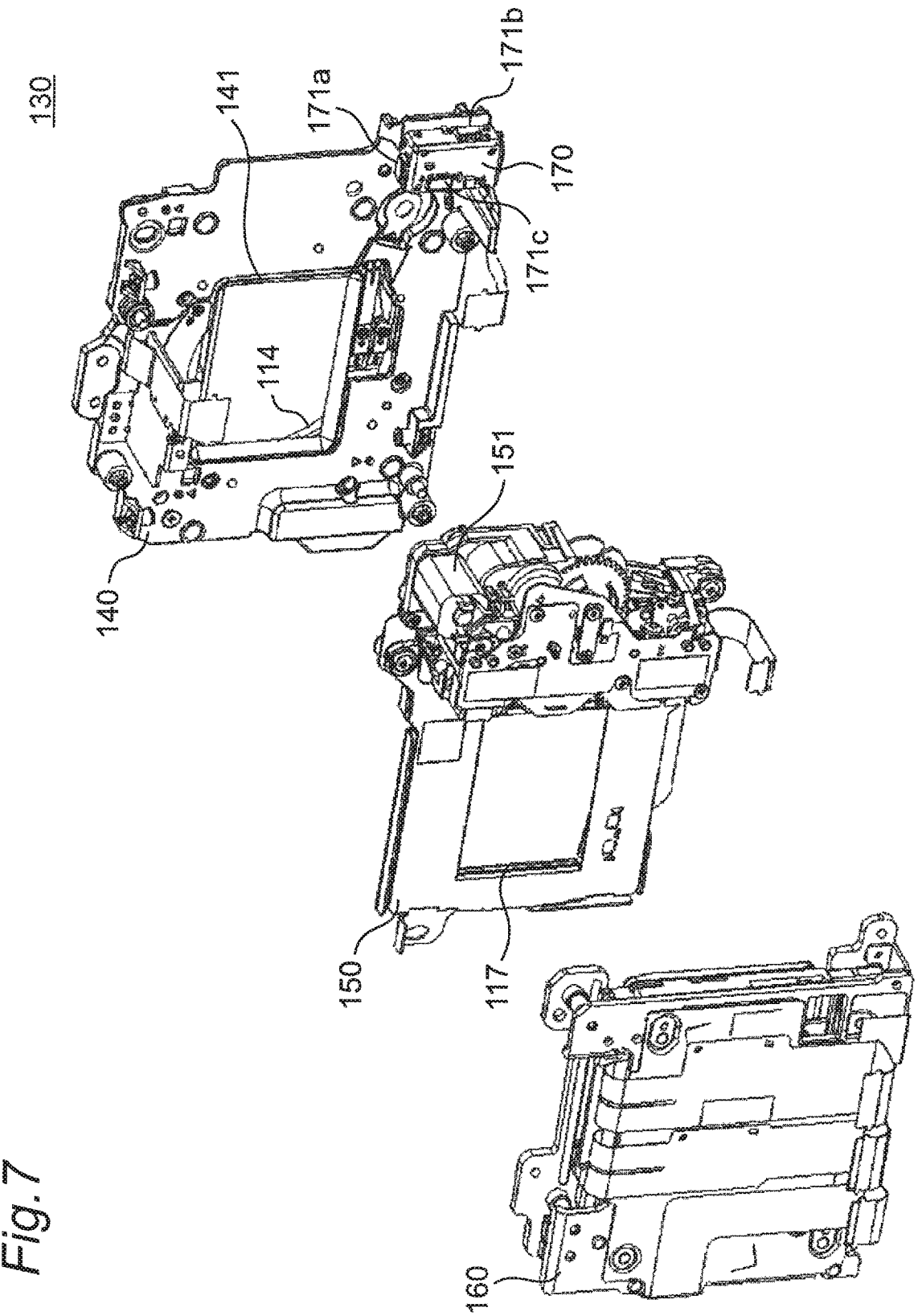
FIG. 7 is an exploded perspective view of the mount box included in the camera body of FIG. 1 as viewed from the back side.

FIG. 6 is an exploded perspective view of the mount box 130 as viewed from the front side. FIG. 7 is an exploded perspective view of the mount box 130 as viewed from the back side.

The mount box 130 includes a mount base 140, a shutter unit 150, and an image-shake correction unit 160.

The mount base 140 includes the body mount 114 and is fixed to the front unit 101A such that the body mount 114 is exposed to the outside through the opening 101Aa and moves integrally with the exterior member 101. The mount base 140 is made up of a substantially rectangular metal plate. The mount base 140 is provided with an opening part 141 at a position facing the CMOS sensor 112. The mount base 140 is configured to hold the shutter unit 150 and the image-shake correction unit 160.

A gyro sensor unit 170 is attached to the mount base 140. The gyro sensor unit 170 has at least one gyro sensor. In the embodiment, the gyro sensor unit 170 includes a plurality of gyro sensors 171a, 171b, 171c. The gyro sensors 171a, 171b, 171c function as the shake detection unit 121 shown in FIG. 3.

The shutter unit 150 includes the shutter 117 capable of blocking an object image focused on the CMOS sensor 112 and a motor 151 driving the shutter 117.

The image-shake correction unit 160 holds the CMOS sensor 112, moves the CMOS sensor 112 based on outputs of the gyro sensors 171a, 171b, 171c, and corrects the shake of the object image taken by the CMOS sensor 112. The image-shake correction unit 160 is equipped with the CMOS drive part 123 shown in FIG. 3.

Figure 8:
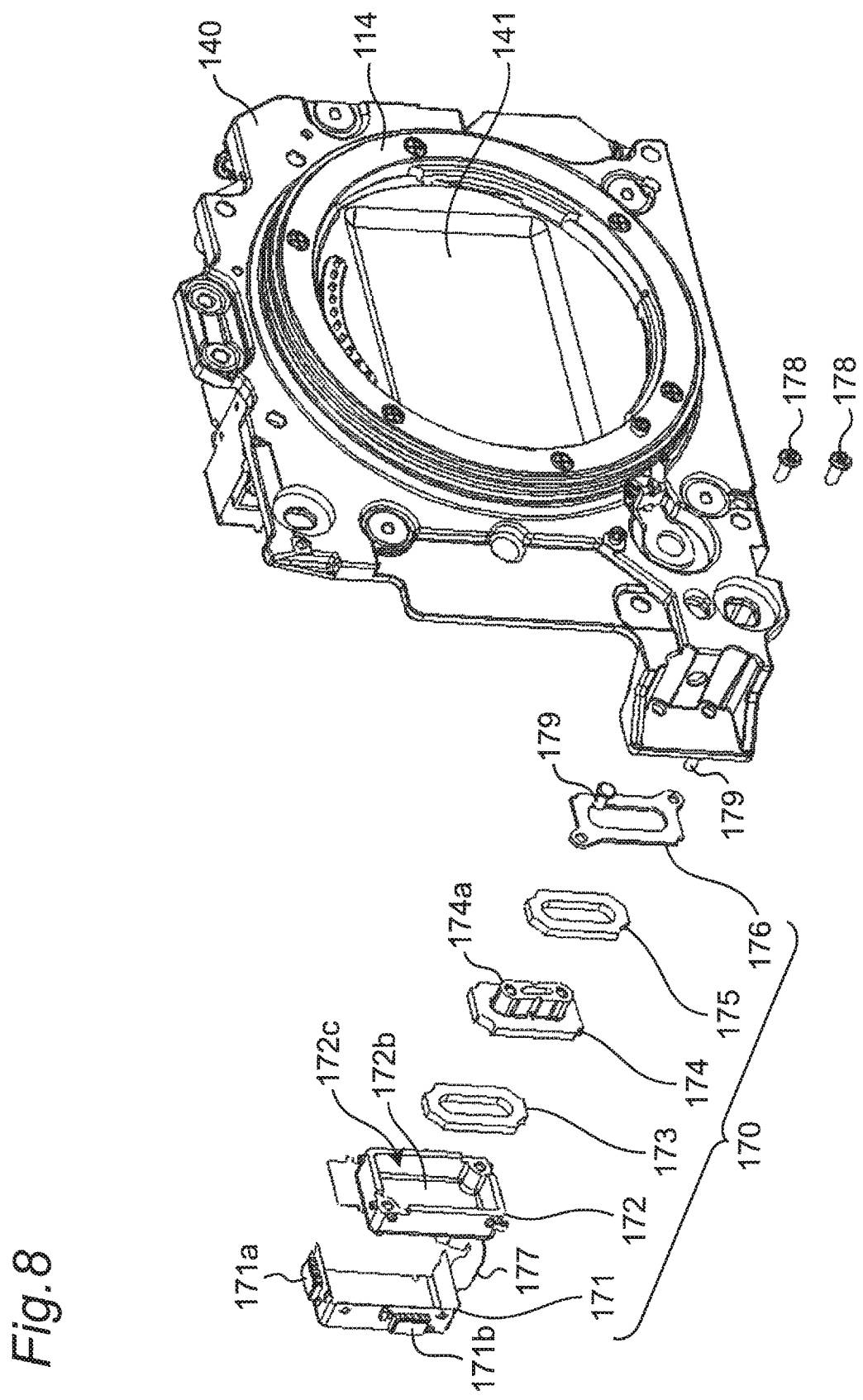
FIG. 8 is an exploded perspective view of a mount base and a gyro sensor unit included in the mount box of FIG. 6 as viewed from the front side.
Figure 9:
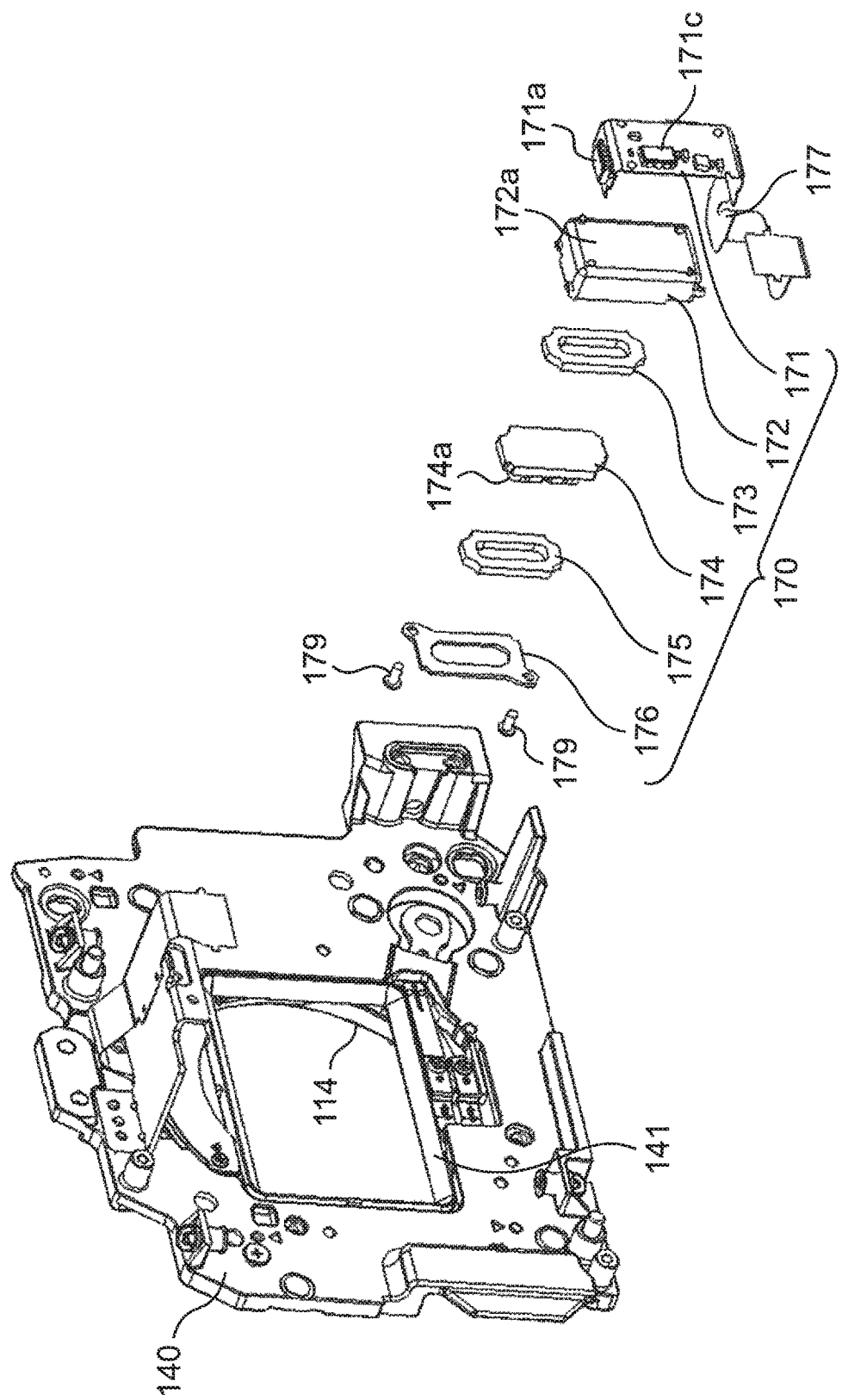
FIG. 9 is an exploded perspective view of the mount base and the gyro sensor unit included in the mount box of FIG. 6 as viewed from the front side.
Figure 10:
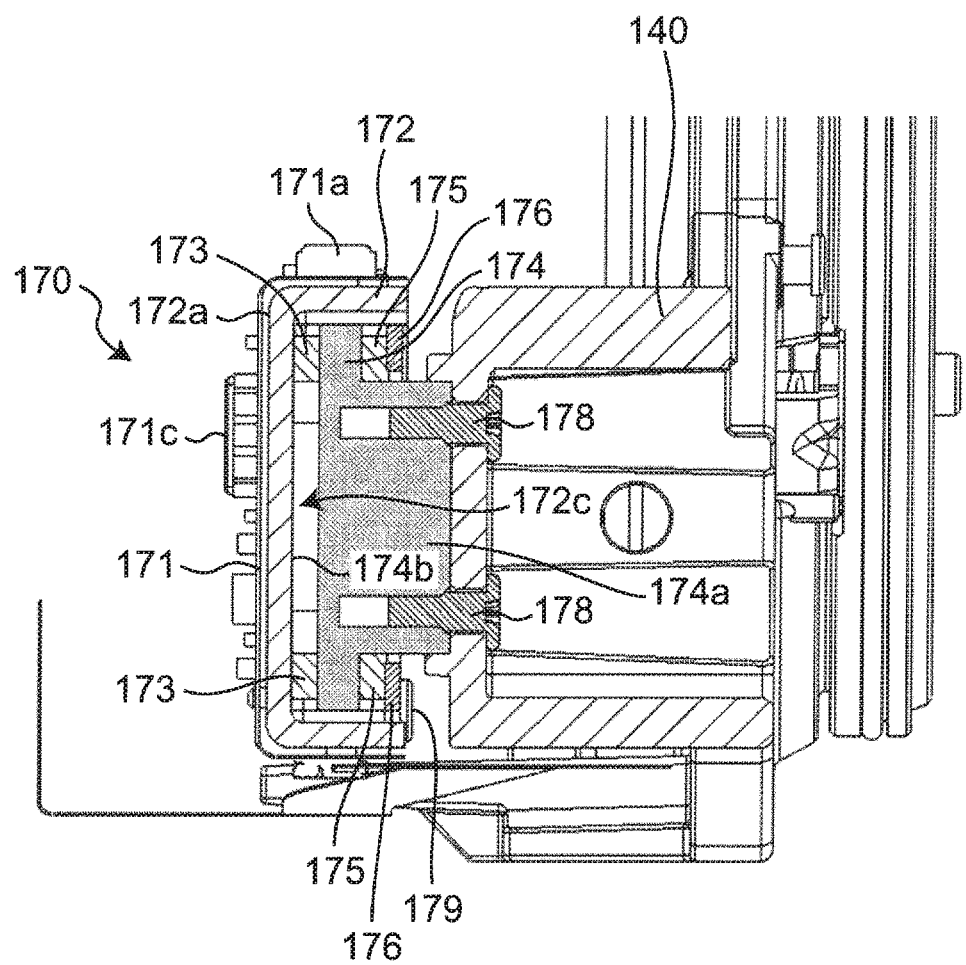
FIG. 10 is an enlarged cross-sectional view showing an attachment structure of the mount base and the gyro sensor unit included in the mount box of FIG. 6.
Figure 11:
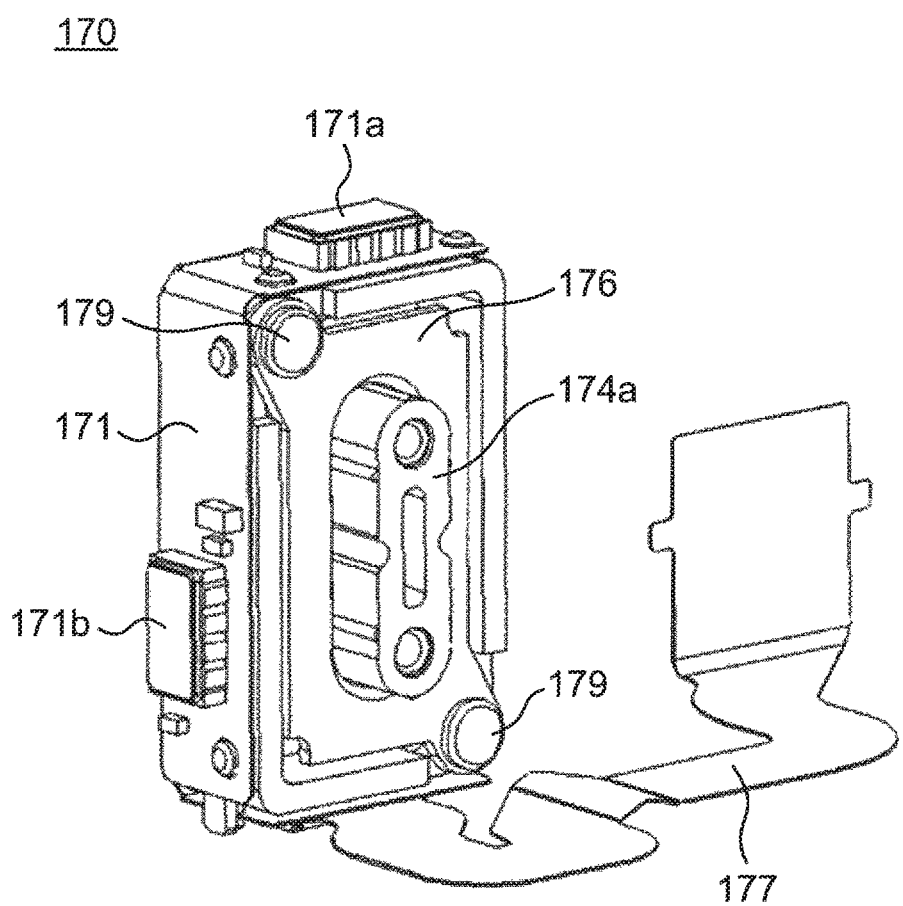
FIG. 11 is an assembled perspective view of the gyro sensor unit of FIG. 8 as viewed from the front side.
Figure 12:
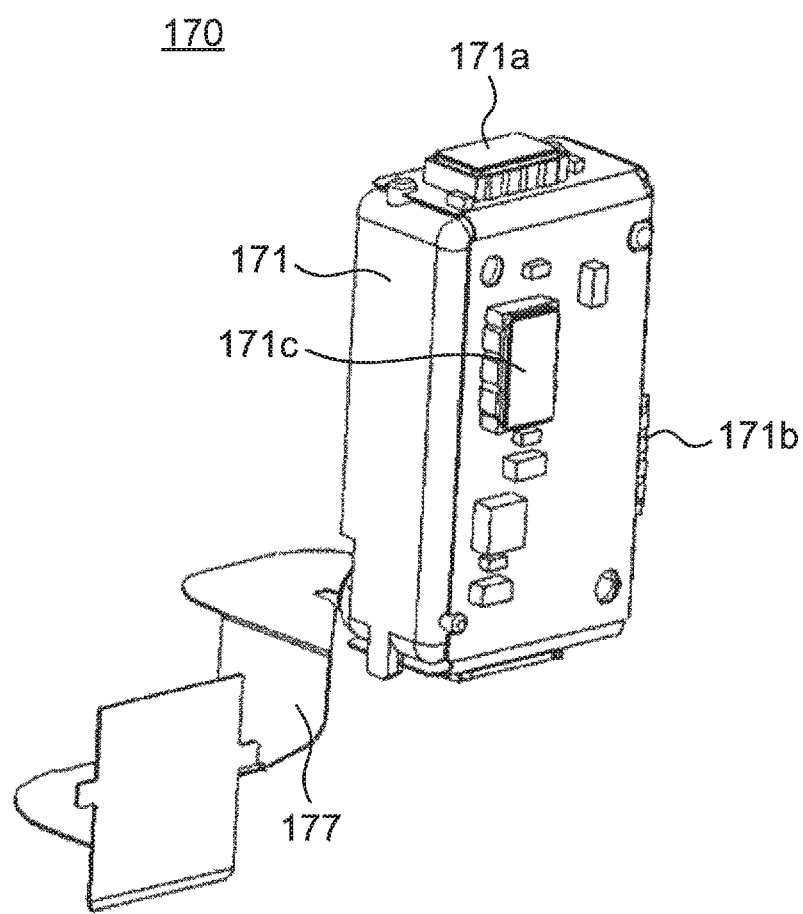
FIG. 12 is an assembled perspective view of the gyro sensor unit of FIG. 8 as viewed from the back side, back side.

FIG. 8 is an exploded perspective view of the mount base 140 and the gyro sensor unit 170 as viewed from the front side. FIG. 9 is an exploded perspective view of the mount base 140 and the gyro sensor unit 170 as viewed from the back side. FIG. 10 is an enlarged cross-sectional view showing an attachment structure of the mount base 140 and the gyro sensor unit 170. FIG. 11 is an assembled perspective view of the gyro sensor unit 170 as viewed from the front side. FIG. 12 is an assembled perspective view of the gyro sensor unit 170 as viewed from the back side.

The gyro sensor unit 170 includes the gyro sensors 171a, 171b, 171c, a gyro holder 172, a sensor-side cushion material 173, a gyro base 174, a plate-side cushion material 175, and a gyro plate 176.

The gyro sensors 171a, 171b, 171c are attached to respective surfaces of a fixed metal plate 171 having three surfaces orthogonal to each other such that the gyro sensors are arranged at positions orthogonal to each other. The fixed metal plate 171 is fixed to the gyro holder 172 by a double-sided tape or an adhesive, for example. A flexible printed board 177 is attached to the fixed metal plate 171. The flexible printed board 177 is connected to a main board (not shown) disposed inside the rear unit 101B and transmits detection signals of the gyro sensors 171a, 171b, 171c to the main board.

The gyro holder 172 has a first principal surface 172a and a second principal surface 172b opposite to the first principal surface 172a. The gyro holder 172 holds the fixed metal plate 171 on the first principal surface 172a to hold the gyro sensors 171a, 171b, 171c. In the embodiment, the gyro holder 172 is made of metal. Specifically, the gyro holder 172 is made of metal (e.g., stainless steel) having high rigidity so as not to be deformed by a repulsive force of the sensor-side cushion material 173. The gyro holder 172 has a concave part 172c on the second principal surface 172b side. In the embodiment, the gyro holder 172 is formed in a shape of a container opened on one surface.

The sensor-side cushion material 173 is disposed between the gyro sensors 171a, 171b, 171c and the mount base 140 so that the gyro sensors 171a, 171b, 171c can move relative to the mount base 140. In the embodiment, the sensor-side cushion material 173 is disposed between the gyro base 174 and the second principal surface 172b of the gyro holder 172 so that the gyro base 174 and the gyro holder 172 can move relative to each other. As a result, the gyro holder 172 is held by the sensor-side cushion material 173 in a floating state with respect to the gyro base 174. The sensor side cushion material 173 is made of a material having a property of absorbing impact and vibration. For example, the sensor-side cushion material 173 is made of Sorbo (registered trademark) manufactured by Sanshin Enterprises Co., Ltd.

The gyro base 174 is housed in the concave part 172c of the gyro holder 172 via the sensor-side cushion material 173. The gyro base 174 is fixed to the mount base 140. In the embodiment, the gyro base 174 has a convex part 174a projecting in a direction away from a bottom surface of the concave part 172c of the gyro holder 172 and fixed to the mount base 140. The gyro base 174 is fastened by the two screws 178 screwed into the convex part 174a via the mount base 140. The gyro base 174 is fixed inside the outer shape of the gyro holder 172 when viewed in the direction of attachment to the mount base 140 (the left-right direction of FIG. 10). Therefore, the outer shape of the gyro base 174 is designed to be smaller than the outer shape of the gyro holder 172 when viewed in the direction of attachment to the mount base 140.

The plate-side cushion material 175 is formed into a ring shape and is disposed between the gyro base 174 and the gyro plate 176 and around the convex part 174a. The plate-side cushion material 175 is made of a material having a property of absorbing impact and vibration. For example, the plate-side cushion material 175 is made of Sorbo (registered trademark) manufactured by Sanshin Enterprises Co., Ltd. The sensor-side cushion material 173 and the plate-side cushion material 175 can be formed into the same shape and made of the same material so that common components can be utilized.

The gyro plate 176 is formed into a ring shape and is disposed between the plate-side cushion material 175 and the mount base 140 and around the convex part 174a. The gyro plate 176 is fixed to the gyro holder 172 so as to hold (retain) the gyro base 174 in the concave part 172c. In the embodiment, the gyro plate 176 is fastened by two screws 179 to the gyro holder 172 with the sensor-side cushion material 173, the gyro base 174, and the plate-side cushion material 175 housed in the concave part 172c.

According to the embodiment, the shutter unit 150, the image-shake correction unit 160, and the gyro sensor unit 170 are configured to be held by the same mount base 140. This can reduce the number of the members interposed between the gyro sensors 171a, 171b, 171c and the CMOS sensor 112 and shorten the distance therebetween to make a difference in movement amount smaller between the gyro sensors 171a, 171b, 171c and the CMOS sensor 112 when a shake of the device occurs. Additionally, in an assembly stage of the device, positions, materials, weights, etc. of the components can be adjusted while the units are held by the mount base 140. This can suppress erroneous detection of the gyro sensors 171a, 171b, 171c and reduce the difference in movement amount between the gyro sensors 171a, 171b, 171c and the CMOS sensor 112. By fixing the mount base 140 holding the units to the exterior member 101 after the adjustment of the positions, materials, weights, etc. of the components, the image shake can more accurately be corrected.

According to the embodiment, the sensor-side cushion material 173 is disposed between the gyro sensors 171a, 171b, 171c and the mount base 140 so that the gyro sensors 171a, 171b, 171c can move relative to the mount base 140. As a result, by adjusting the elastic force etc. of the sensor-side cushion material 173 such that the momentary shock due to the shutter is absorbed while the shake of the exterior member is transmitted to the gyro sensors 171a, 171b, 171c, the image shake can more accurately be corrected.

According to the embodiment, the gyro holder 172 is made of metal. As a result, the weight of the gyro holder 172 can be increased so as to further suppress the transmission of the momentary shock due to the shutter to the gyro sensors 171a, 171b, 171c. Additionally, the gyro holder 172 can be prevented from deforming due to the repulsive force of the sensor-side cushion material 173 to suppress deviation of the orthogonal arrangement of the gyro sensors 171a, 171b, 171c.

According to the embodiment, since the gyro sensors 171a, 171b, 171c are located on the outer surface (the first principal surface 172a side) of the fixed metal plate 171, fixing positions between the gyro base 174 and the mount base 140 can be set inside the outer shape of the gyro holder 172. Therefore, in the embodiment, the gyro base 174 is fixed to the mount base 140 inside the outer shape of the gyro holder 172 when viewed in the direction of attachment to the mount base 140. As a result, the gyro sensor unit 170 can be reduced in size as compared to a configuration in which the gyro base 174 is fixed to the mount base 140 outside the outer shape of the gyro holder 172.

According to the embodiment, the gyro base 174 is housed in the concave part 172c of the gyro holder 172. Therefore, the gyro sensor unit 170 can be reduced in size. For example, it is assumed that a conventional gyro sensor unit has outer shape dimensions of 39.9 mm×21.7 mm×9.3 mm. If the gyro sensor unit 170 is configured to have performance equivalent to this conventional gyro sensor unit, the gyro sensor unit can be reduced in size to the outer shape dimensions of 21.52 mm×12 mm×9.125 mm.

According to the embodiment, the gyro sensor unit 170 includes the gyro plate 176 fixed to the gyro holder 172 so as to hold the gyro base 174 in the concave part 172c via the plate-side cushion material 175. Therefore, as shown in FIGS. 11 and 12, the components of the gyro sensor unit 170 can be attached to the mount base 140 in a preassembled state, so that the handleability of the gyro sensor unit 170 can be improved.

Figure 13:
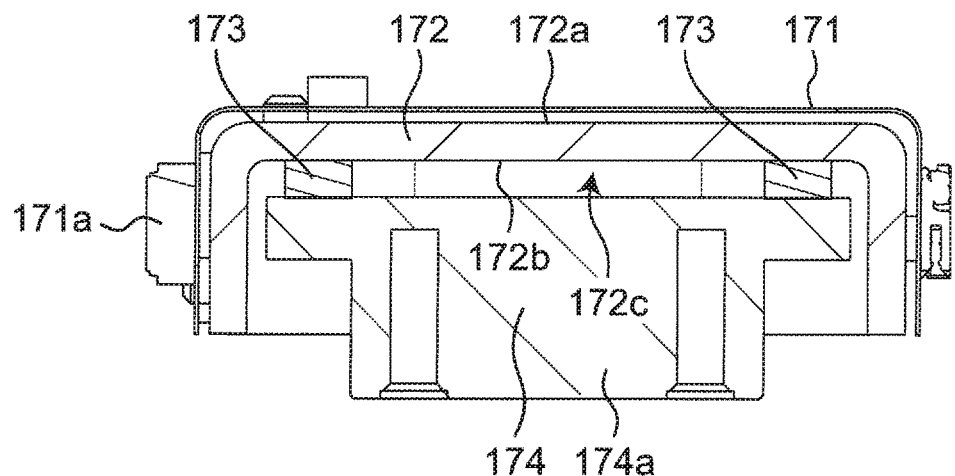
FIG. 13 is a cross-sectional view showing a first modification of the gyro sensor unit of FIG. 8.
Figure 14:
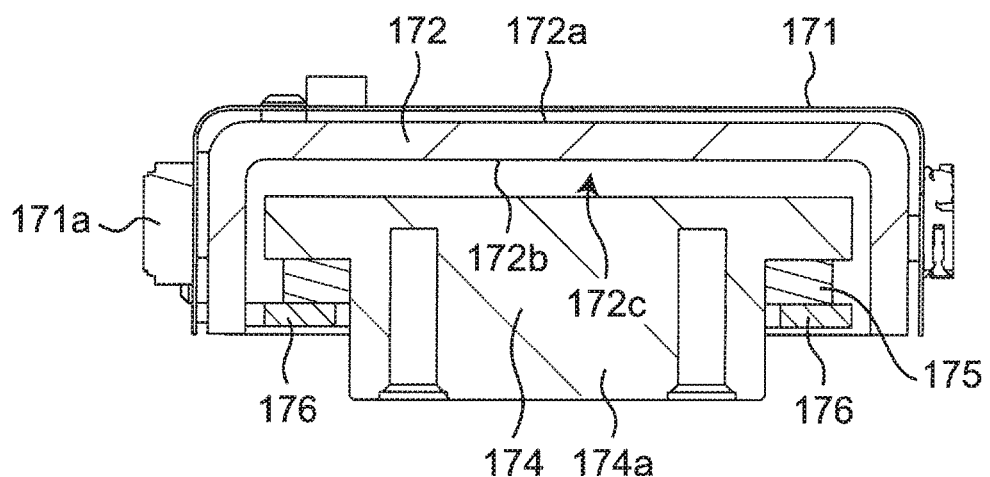
FIG. 14 is a cross-sectional view showing a second modification of the gyro sensor unit of FIG. 8.

Although the gyro sensor unit 170 includes the sensor-side cushion material 173 and the plate-side cushion material 175 in the configuration described above, the configuration of the imaging device 1 is not limited thereto. For example, as shown in FIG. 13, the gyro sensor unit 170 may include only the sensor-side cushion material 173 and may not include the plate-side cushion material 175. Alternatively, as shown in FIG. 14, the gyro sensor unit 170 may include only the plate-side cushion material 175 and may not include the sensor-side cushion material 173.

Figure 15:
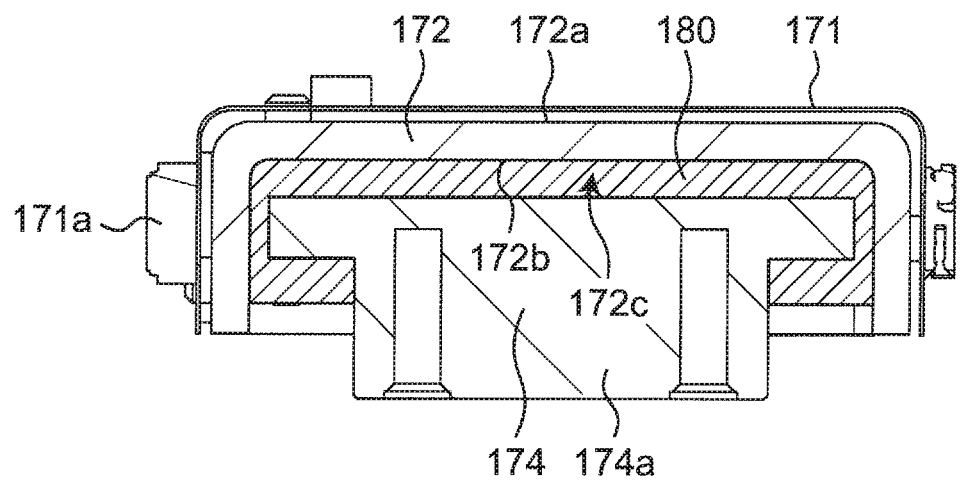
FIG. 15 is a cross-sectional view showing a third modification of the gyro sensor unit of FIG. 8.

Additionally, although the gyro sensor unit 170 includes the sensor-side cushion material 173 and the plate-side cushion material 175 in the configuration described above, the configuration of the imaging device 1 is not limited thereto. For example, as shown in FIG. 15, the gyro sensor unit 170 may include one cushion material 180 among the gyro holder 172, the gyro base 174, and the gyro plate 176. The cushion material 180 may be in a solid state, a gel state (e.g., alpha gel (trade name)), or a liquid state.

Figure 16:
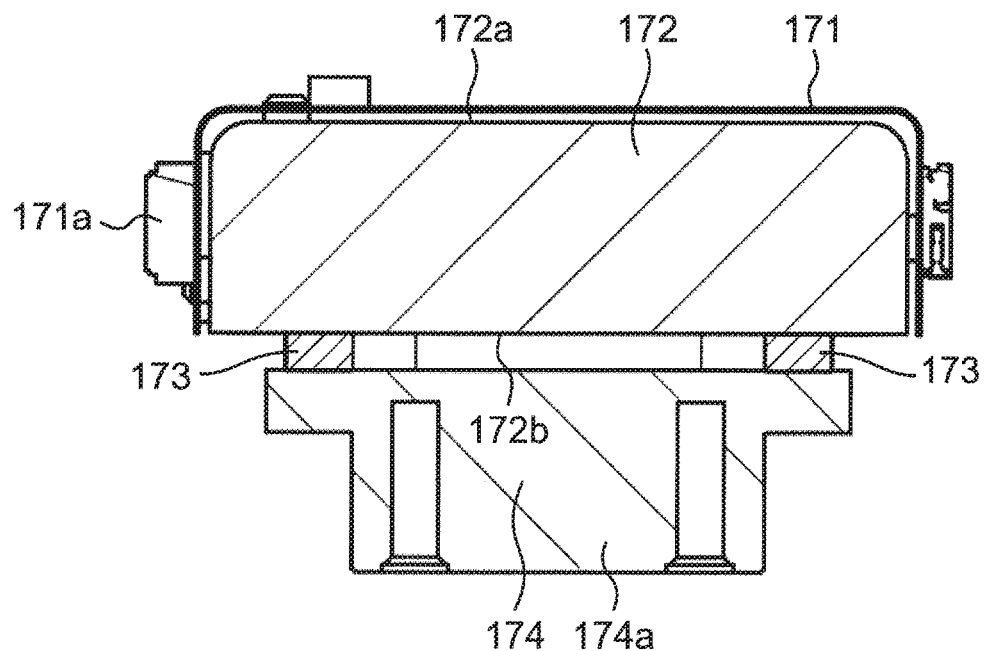
FIG. 16 is a cross-sectional view showing a fourth modification of the gyro sensor unit of FIG. 8.

Although the gyro holder 172 has the concave part 172c and the gyro base 174 is held in the concave part 172c in the configuration described above, the configuration of the imaging device 1 is not limited thereto. For example, as shown in FIG. 16, the gyro holder 172 may be formed into a block shape, and the gyro base 174 may be held on the outside of the gyro holder 172.

Although the imaging device 1 is a lens-interchangeable digital camera in the above description, the configuration of the imaging device 1 is not limited thereto. For example, the imaging device 1 may be a lens-integrated digital camera.

Although the CMOS sensor 112 is used as an example of the imaging element in the above description, the configuration of the imaging device 1 is not limited thereto. For example instead of the CMOS sensor 112, another imaging element such as a CCD (Change Coupled Device) sensor may be used.

Although the shutter 117 is a focal plane shutter in the above description, the configuration of the imaging device 1 is not limited thereto. For example, the shutter 117 may be a mechanical shutter (high-impact shutter) or an electromagnetic shutter (low-impact shutter). For the shutter 117, an electronic front curtain shutter may be used.

Although the mount base 140 holds the shutter unit 150 in the above description, the configuration of the imaging device 1 is not limited thereto. For example, the mount base 140 may be a shutterless camera using only an electronic shutter that does not hold the shutter unit 150. Even this configuration can reduce the number of the members interposed between the gyro sensors 171a, 171b, 171c and the CMOS sensor 112 and shorten the distance therebetween. As a result, the difference in movement amount can be made smaller between the gyro sensors 171a, 171b, 171c and the CMOS sensor 112 when a shake of the device occurs. Additionally, in an assembly stage of the device, positions, materials, weights, etc. of the components can be adjusted while the units are held by the mount base 140. This can suppress erroneous detection of the gyro sensors 171a, 171b, 171c and reduce the difference in movement amount between the gyro sensors 171a, 171b, 171c and the CMOS sensor 112. By fixing the mount base 140 holding the units to the exterior member 101 after the adjustment of the positions, materials, weights, etc. of the components, the image shake can more accurately be corrected.

The embodiment has been described as exemplification of the techniques in this disclosure. The accompanying drawings and the detailed description have been provided for this purpose. Therefore, the constituent elements described in the accompanying drawings and the detailed description may include not only the constituent elements essential for solving the problem but also constituent elements not essential for solving the problem so as to exemplarily describe the techniques. Therefore, even though these non-essential constituent elements are included in the accompanying drawings and the detailed description, these non-essential constituent elements should not immediately be recognized as being essential.

Since the embodiment described above is intended to exemplarily describe the techniques in the present disclosure, various modifications, replacements, additions, and omissions can be made within the claims and the scope equivalent thereto.

INDUSTRIAL APPLICABILITY

The imaging device according to the present disclosure can more accurately correct an image shake and is therefore useful for electronic devices having an imaging function such as digital cameras, video cameras, smartphones, and game machines, for example.

EXPLANATIONS OF LETTERS OR NUMERALS 1 imaging device
100 camera body
101 exterior member
101A front unit
101Aa opening part
101B back unit
102 release button
103 mode dial
104 hot shoe
105 liquid crystal monitor
106 finder
111 camera controller
112 CMOS sensor
113 timing generator
114 body mount
115 DRAM
116 analog-digital conversion circuit 117 shutter
118 memory card
119 card slot
120 power source
121 shake detection unit
122 position sensor
123 CMOS drive part
124 BIS processing part
130 mount box
140 mount base
141 opening part
150 shutter unit
151 motor
160 image-shake correction unit
170 gyro sensor unit
171 fixed metal plate
171a, 171b, 171c gyro sensor
172 gyro holder
172a first principal surface
172b second principal surface
172c concave part
173 sensor-side cushion material
174 gyro base
174a convex part
175 plate-side cushion material
176 gyro plate
177 flexible printed board
178, 179 screw
180 cushion material
200 interchangeable lens unit
201 lens mount
202 lens controller
203 zoom lens
204 OIS lens
205 focus lens
206 zoom lens drive part
207 shake detection unit
208 position sensor
209 OIS drive part
210 OIS processing part
211 focus lens drive part
212 DRAM
213 flash memory
A1 optical axis direction
OP optical system

The invention claimed is:

1. An imaging device comprising:
an imaging element taking an object image to generate image data;
a gyro sensor unit including a gyro sensor;
an image-shake correction unit holding the imaging element, moving the imaging element based on an output of the gyro sensor, and correcting a shake of an object image taken by the imaging element;
a shutter unit including a shutter for blocking an object image focused on the imaging element; and
a mount base holding the gyro sensor unit, the image-shake correction unit, and the shutter unit, wherein
the gyro sensor unit includes
a gyro holder including a first principal surface and a second principal surface opposite to the first principal surface and holding the gyro sensor on the first principal surface, and
a sensor-side cushion material disposed between the second principal surface of the gyro holder and the mount base to allow the gyro sensor to move relative to the mount base,
the gyro holder is made of metal.

2. The imaging device according to claim 1, wherein the mount base is fixed to an exterior member.

3. The imaging device according to claim 1, wherein
the gyro sensor unit includes
a gyro base fixed to the mount base, and wherein
the sensor-side cushion material is disposed between the gyro base and the second principal surface of the gyro holder to allow the gyro base and the gyro holder to move relative to each other.

4. The imaging device according to claim 3, wherein the gyro base is fixed to the mount base inside an outer shape of the gyro holder when viewed in a direction of attachment to the mount base.

5. The imaging device according to claim 4, wherein
the gyro holder has a concave part on the second principal surface side, and wherein
the gyro base is housed in the concave part.

6. The imaging device according to claim 5, wherein
the gyro base has a convex part projecting in a direction away from a bottom surface of the concave part and fixed to the mount base, and wherein
the gyro sensor unit further includes
a ring-shaped gyro plate fixed to the gyro holder to hold the gyro base in the concave part, and
a ring-shaped plate-side cushion material disposed between the gyro base and the gyro plate and around the convex part.

* * * * *